United States Patent [19]
Brown

[11] Patent Number: 4,826,371
[45] Date of Patent: May 2, 1989

[54] CONTAINER SUPPORT PEDESTALS
[75] Inventor: James T. Brown, Central City, Pa.
[73] Assignee: Bethlehem Steel Corp., Bethlehem, Pa.
[21] Appl. No.: 182,700
[22] Filed: Apr. 18, 1988
[51] Int. Cl.[4] .................. B61D 45/00; B60P 7/00
[52] U.S. Cl. .......................................... 410/54; 410/72
[58] Field of Search ............ 410/44, 52, 54, 71, 410/72, 73, 94, 83, 82, 107, 111; 294/68.3, 81.51, 81.53

[56] References Cited
U.S. PATENT DOCUMENTS

| 2,172,244 | 9/1939 | Grundler | 410/54 X |
| 3,261,637 | 3/1964 | Bopp et al. | 294/68.3 |
| 3,321,162 | 5/1965 | Connerat | 410/73 |
| 3,547,048 | 5/1968 | Miller. | |
| 3,556,449 | 1/1971 | Connerat et al. | 410/73 |
| 3,557,710 | 1/1971 | Miller. | |
| 3,557,711 | 1/1971 | Dobson et al. | |
| 3,575,118 | 4/1971 | Gramse. | |
| 3,805,709 | 4/1974 | Schuller et al. | 410/72 |

FOREIGN PATENT DOCUMENTS 685057  4/1964  Canada ............................... 410/82

Primary Examiner—Robert B. Reeves
Assistant Examiner—Dean J. Kramer
Attorney, Agent, or Firm—John I. Iverson

[57] ABSTRACT

A container support apparatus for supporting cargo containers being transported on railroad container cars the apparatus comprising a pair of pivotal support pedestals spaced opposite from each other along the side sills of the railroad container car and connected to transverse linkage to permit raising or lowering the pedestals from either side of the railroad car.

5 Claims, 4 Drawing Sheets

CONTAINER SUPPORT PEDESTALS

BACKGROUND OF THE INVENTION

This invention relates to apparatus for supporting the corners of cargo containers being transported on railroad container cars. It relates particularly to apparatus for supporting the adjacent corners of two 20 foot long containers being transported on a single freight deck of an articulated railroad container car where the car is adapted to carry containers of different lengths. The continuous development of cargo containers has resulted in standardized containers of four different lengths. Today's state of the art container measures either 48, 45, 40 or 20 feet in length and a modern railroad container car is typically adapted to handle all four lengths of containers.

When cargo containers are transported on container cars the four corners of the 48, 45 and 40 foot long containers are generally secured with locking devices located on the freight deck of the container car. However, when two 20 foot long containers are transported on the same freight deck, only their outboard ends can be secured with the above locking devices. Their inboard ends must be supported with additional, intermediate, support means which must be removable to prevent interference with the longer containers.

In the past, cargo containers have been secured to freight decks by using either removable or pivotal devices to avoid conflict with longer containers. Though effective, these devices of the past have been inconveient. They typically included securing devices on one side of the freight car which operate independent of corresponding devices on the opposite side of the car. Such an arrangement requires the use of two operators, one on each side of the freight car, or a single operator who must continually climb over the freight cars to operate the devices.

SUMMARY OF THE INVENTION

It is therefore an object of this invention to provide a support means for securing the inboard ends of two containers being transported on the same freight deck of a railroad container car. It is a further object of this invention to provide a support means comprising support pedestals adopted to support the adjacent lower corners of two containers being transported on the same freight deck of a railroad container car. It is a still further object of this invention to provide a container support means comprising pedestals that are pivotal between an upright active position and a horizontal stored position. It is still a further object of this invention to provide a container support means comprising pivotal support pedestals having transverse linkage to permit raising or lowering the pedestals to an active or stored position from either side of the freight car.

It has been discovered that the foregoing objectives can be attained by providing a container support means comprising a pedestal assembly having a pivot means pivotally attached at one end to linkage said linkage extending from one side of the freight vehicle to the opposite side of the freight vehicle and providing multiple means to raise or lower the pedestal assembly.

BRIEF DESCRIPTION OF THE DRAWINGS

FIG. 4 is a cross-sectional view looking outboard from the center sill of a railroad car taken along the lines 4—4 of FIG. 1.

FIG. 5 is a cross-sectional view looking outboard from the center sill of a railroad car taken along the lines 5—5 of FIG. 1.

DESCRIPTION OF THE PREFERRED EMBODIMENT

Figure 1:
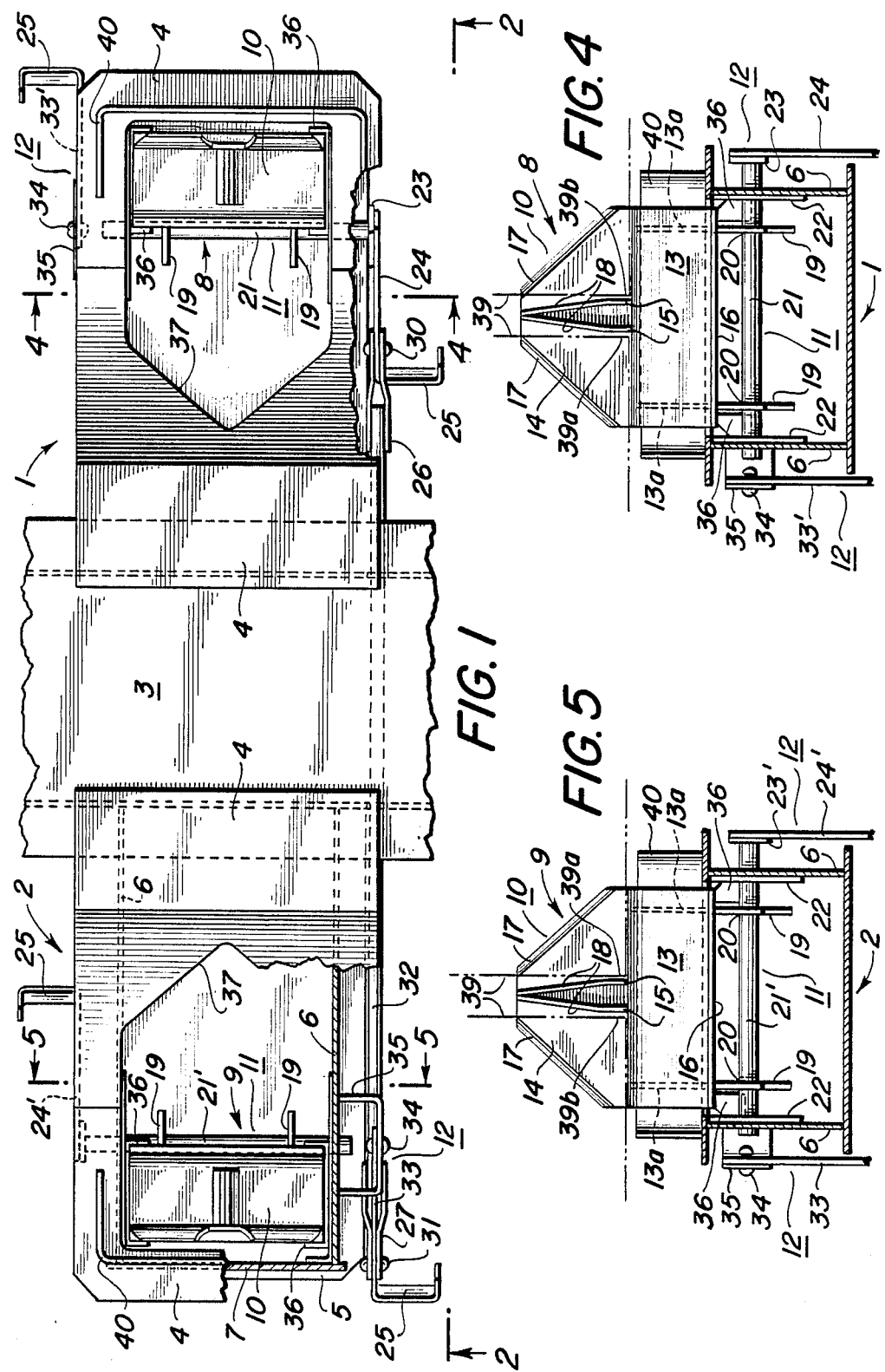
FIG. 1 is a plan view of the container support means of the invention showing the pedestal arrangement and attachment to the center sill of a railroad car.
Figure 2:
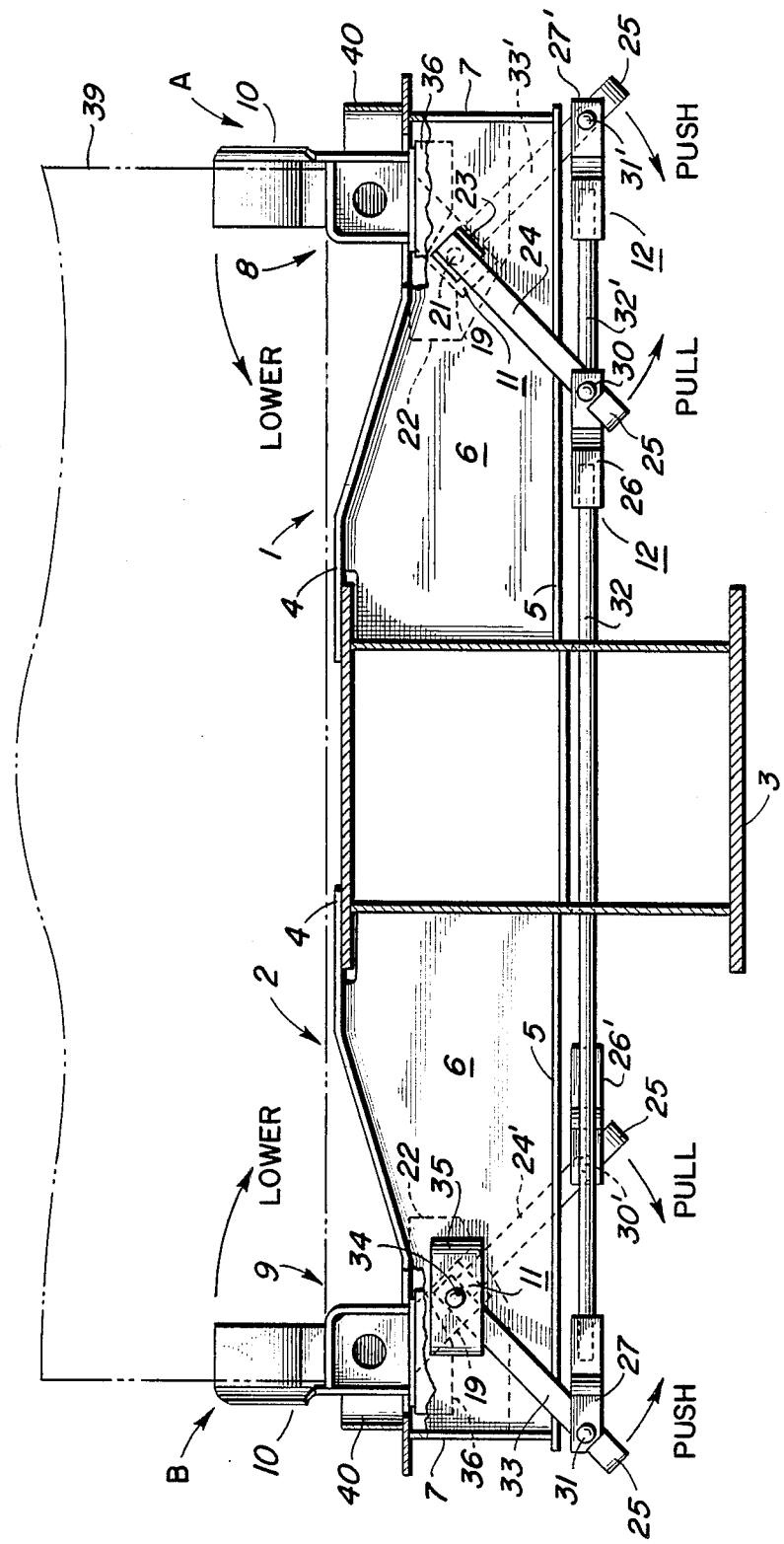
FIG. 2 is an elevational view taken along the lines 2—2 of FIG. 1 showing the pedestals of a container support means raised to support a container.
Figure 3:
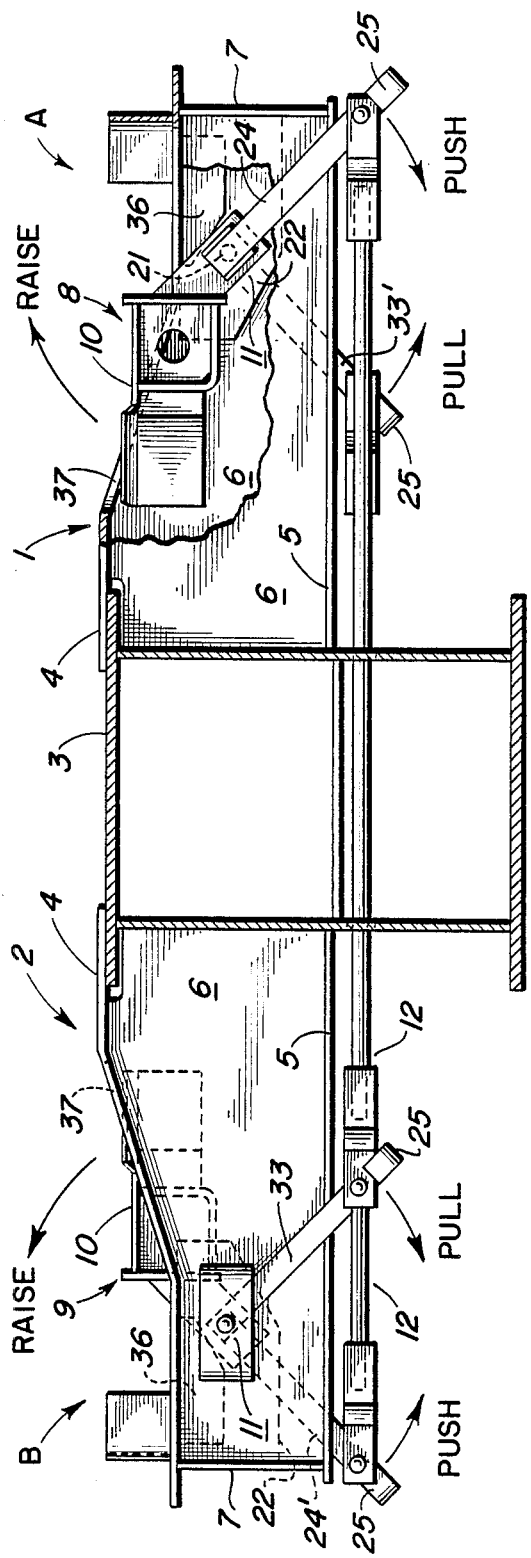
FIG. 3 is an elevational view similar to FIG. 2 showing the pedestals of a container support means in their lowered, stored position.
Figure 6:
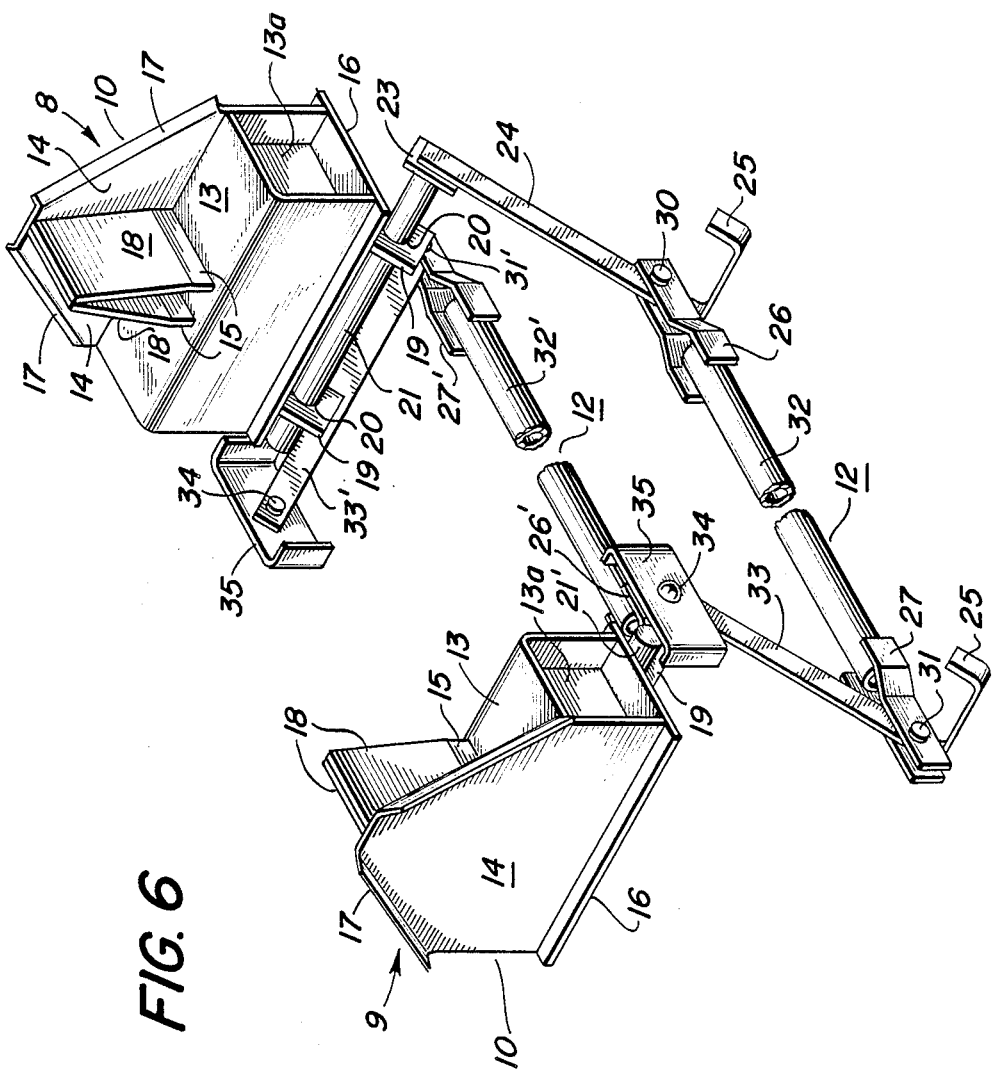
FIG. 6 is a schematic isometric view showing a pair of opposite hand pedestal assemblies and transverse linkage.

Referring to FIGS. 1 through 3 of the drawings, opposite hand cantilevered structural members 1 and 2 are shown extending from both sides of the center sill 3 of a railroad freight car. Cantilevered members 1 and 2, are attached to center sill 3 by welding or other means and members 1 and 2 include a top and bottom flange 4 and 5, a pair of parallel webs 6 and end plates 7. The top flanges 4 are provided with openings 37 and guard plates 40 for protection at pinch points.

Attached to the outboard ends of structural members 1 and 2 are opposite hand container support means 8 and 9. Each container support means 8 and 9 includes a pedestal assembly 10, a pivot means 11 and transverse linkage 12 for raising and lowering the pedestal assemblies 10 from either side of the freight car.

As more clearly shown in FIGS. 4 and 5, pedestal assemblies 10 are adapted to support the adjacent bottom corners 39a and 39b of two cargo containers being transported on the same freight deck of a railroad car. Each pedestal assembly 10 comprises a weldment of various plates and angles to provide a support means for containers 39 and includes an angle or bent plate 13 providing vertical support for container 39, a plate member 14 providing lateral support for container 39 and a pair of plates 15 providing longitudinal support for container 39. Angle 13 and plates 14 and 15 are attached to a base plate 16 by welding or other means and stiffeners 13a are welded to angle 13 and base plate 16. Plate 14 includes inclined portions 17 along two chamfered edges to guide containers 39 into position as they are being loaded onto the freight deck. Plates 15 are also provided with inclined portions 18 to guide the containers onto the freight deck.

Lugs 19, welded to the underside of base plate 16, rotatably attach each pedestal assembly 10 to hinge pins 21 and 21' of pivot means 11. Hinge pins 21 and 21' are rotatably supported within bearing plates 22 which are welded to webs 6 of cantilevered members 1 and 2 and one end of the hinge pins 21 and 21' is rotatably attached to the transverse linkage 12.

Referring to FIGS. 2, 4, 5 and 6 of the drawings, hinge pins 21 and 21' are retained within openings 20 of lugs 19 by welding and the hinge pins are also fixed at one end to shim plates 23 and 23' which are welded to one end of lever arms 24 and 24' of the transverse linkage 12. The other end of each lever arm 24 and 24' is formed to provide a handle 25 and each lever arm 24 and 24' is pivotally attached to a corresponding clevis 26 or 26' by fasteners held within holes provided at pivot points 30 and 30'. Elongated bar like members 32 and 32' are attached to each clevis 26 and 26' by welding or other means and each elongated member 32 and 32' extends horizontally through holes provided in the webs of center sill 3 to a corresponding clevis 27 and 27' at the opposite side of the freight car. Each elongated member 32 and 32' is welded to its corresponding clevis 27 or 27' which is pivotally attached to its respective lever arm 33 or 33' by fasteners held within holes provided at pivot points 31 and 31'. The lever arms 33 and 33' are thereby interconnected to their corresponding lever arms 24 and 24' on the opposite side of the freight car. Lever arms 33 and 33' are also provided with a handle portion 25 at one end and fasteners 34 pivotally connect the other end of lever arms 33 and 33' to channel shaped brackets 35 fixed to webs 6 of cantilevered members 1 and 2 by welding or other means.

As shown in FIG. 3, when the pedestal assemblies 10 are stored within openings 37 provided in flange 4 of the cantilevered members 1 and 2, lever arms 24 and 33 are biased toward side "A" of the freight car and lever arms 24' and 33' are biased toward side "B" of the freight car. An operator standing along side "A" of the freight car is able to raise both pedestals by pushing on handle 25 of lever arm 24 to raise the pedestal 10 on side "A", and by pulling on handle 25 of lever arm 33' to raise pedestal 10 on side "B" of the freight car. Likewise, if the operator were standing along side "B" of the freight car, he would be able to raise both pedestals and by pushing on handle 25 of lever arm 24' to raise pedestal 10 on side "B", and by pulling on handle 25 of lever arm 33 to raise pedestal 10 on side "a" of the freight car.

As the lever arms are either pushed or pulled to raise pedestals 10, hinge pins 21 and 21' rotate within bearing plates 22 to rotate the pedestals to an upright position with their base plates 16 supported upon bearing lugs 36. Bearing lugs 36 are attached to the webs 6 of cantilevered members 1 and 2 and the weight of container 39 is partially distributed from pedestal assembly 10 through the bearing lugs 36 into the structural framework of the freight car.

As illustrated in FIG. 2, when the pedestals 10 are in their upright position lever arms 24 and 33 are biased toward side "B" of the freight car and lever arms 24' and 33' are biased toward side "A" of the freight car. To lower both pedestals 10 an operator standing along side "a" would pull on handle 25 of lever arm 24 and push on handle 25 of lever arm 33', or, an operator standing along side "B" would push on handle 25 of lever arm 33 and pull on handle 25 of lever arm 24'.

Although the invention has been illustrated and described in certain embodiments, it is understood that other embodiments and changes may be made without departing from the scope of the invention as set forth. For example, the pedestals may be adapted to accept and support the corners of single longer containers rather than the adjacent corners of two containers, and the support means may be arranged to adapt to different container combinations and arrangements.

I claim:

1. A container support means for use on a freight vehicle said container support means comprising:
   (a) a pedestal assembly having means for supporting containers,
   (b) a pivot means attached to said pedestal assembly providing means to rotate said pedestal assembly toward the longitudinal center line of the freight vehicle to a stored position or away from the longitudinal center line of the freight vehicle to an upright active postion, and
   (c) linkage attached to said pivot means and extending from one side of the freight vehicle to the opposite side of the freight vehicle said linkage providing means on each side of the freight vehicle to rotate said pedestal assembly toward the longitudinal center line of the freight vehicle to a stored position or away from the longitudinal center line of the freight vehicle to an upright active position.

2. The invention of claim 1 in which the pedestal assembly (a) includes a base plate said base plate having lugs attached to pivot means (b) and said pivot means comprising bearing plates fixed to the framework of the freight vehicle, and a hinge pin, said hinge pin being rotatably supported by said bearing plates, attached to the lugs of said base plate and pivotally attached at one end to linkage (c).

3. The invention of claim 2 in which the linkage (c) comprises:
   (a) a first lever arm, said first lever arm including:
      (i) a first end portion attached to said hinge pin of the pivot means (b),
      (ii) a second end portion provided with a handle means, and
      (iii) a hole through said first lever arm at a given pivot point;
   (b) a second lever arm, said second lever arm including:
      (i) a first end portion pivotally attached to the framework of the freight vehicle,
      (ii) a second end portion provided with a handle means, and
      (iii) a hole through said second lever arm at a given pivot point;
   (c) a first clevis means pivotally attached to said first lever arm by means of a fastener inserted in said hole (iii) of first lever arm,
   (d) a second clevis means pivotally attached to said second lever arm by means of a fastener inserted in said hole (iii) of second lever arm, and
   (e) an elongated member connecting first clevis means (c) to second clevis means (d).

4. The invention of claim 1 in which a lug means is provided to transfer the load of a container from the pedestal assembly (a) to the framework of the freight vehicle.

5. The invention of claim 1 in which each container support means comprises:
   (a) diametrically opposed pedestal assemblies each pedestal assembly providing means to support containers,
   (b) a pivot means attached to each pedestal assembly providing means to rotate said pedestal assembly toward the longitudinal center line of the freight vehicle to a horizontal stored position or away from the longitudinal center line of the freight vehicle to an upright active position, and
   (c) transverse linkage attached to each pivot means said transverse linkage extending from one side of the freight vehicle to the opposite side of the freight vehicle said linkage providing means on each side of the freight vehicle to rotate said pedestal assembly toward the longitudinal center line of the freight vehicle to a stored position or away from the longitudinal center line of the freight vehicle to an upright active position.

* * * * *